(Model.)

H. D. MUSSELMAN.
Handle Attachment.

No. 237,891.                          Patented Feb. 15, 1881.

Witnesses.
F. L. Ouraud
H. Aubrey Toulmin

Inventor
H. D. Musselman
By
Alexander & Mason

United States Patent Office.

HENRY D. MUSSELMAN, OF LANCASTER, PENNSYLVANIA, ASSIGNOR OF ONE-HALF TO ROBERT M. SLAYMAKER, OF SAME PLACE.

HANDLE ATTACHMENT.

SPECIFICATION forming part of Letters Patent No. 237,891, dated February 15, 1881.

Application filed December 21, 1880. (Model.)

*To all whom it may concern:*

Be it known that I, HENRY D. MUSSELMAN, of Lancaster, in the county of Lancaster, and in the State of Pennsylvania, have invented certain new and useful Improvements in Handle Attachments; and I do hereby declare that the following is a full, clear, and exact description thereof, reference being had to the accompanying drawings, and to the letters of reference marked thereon, making a part of this specification.

This invention is designed to furnish an improved attachment for the handle of a hoe or other similar implement, which may be readily secured thereto and adjusted thereon, and whereby the manipulation of the implement will be rendered much more convenient, and the fatigue attendant upon its use will be materially lessened. These objects I attain by the device illustrated in the accompanying drawings, in which—

Figure 1:
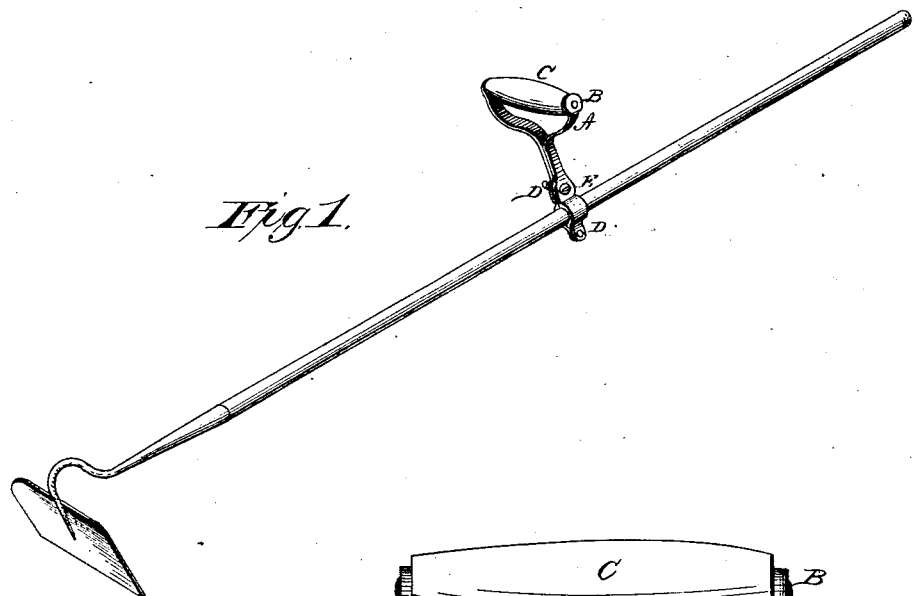
Figure 2:
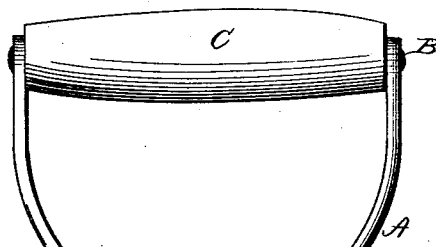

Figure 1 represents a perspective view of a hoe showing my improved attachment applied thereto; and Fig. 2 a view of my improved device detached.

The letter A indicates my improved device, which is constructed of metal, in two parts, as indicated by the letter *a*. The said parts are bent outwardly, as indicated, and are connected by a transverse rod, B, upon which is mounted a sleeve, C, which serves as a handle, by which the device may be grasped. The parts, below their bent ends, are parallel with each other, and are connected by means of screw bolts and nuts D, as indicated in the drawings. Between said nuts the parts of the device are bent semicircularly, forming an eye, E, which is adapted to embrace the handle of a hoe or other implement, as indicated in Fig. 1 of the drawings.

The attachment is applied to the handle of the hoe or implement by passing the eye over the same, and is secured to said handle by clamping the parts together by means of the respective set-screws.

Having thus described my invention, what I claim and desire to secure by Letters Patent is—

A handle attachment consisting of two bent metal pieces, A, transverse bar B, and handle C, the pieces A being formed with an eye, E, to embrace the handle to which the device is to be attached, and with an extension, the extensions and portions of the pieces A adjacent to the eye being perforated and provided with clamping-screws D, substantially as and for the purposes specified.

In testimony that I claim the foregoing I have hereunto set my hand this 4th day of December, 1880.

HENRY D. MUSSELMAN.

Witnesses:
JAMES COYLE,
H. R. MCCONOMY.